United States Patent
Takahashi et al.

(10) Patent No.: US 7,116,412 B2
(45) Date of Patent: Oct. 3, 2006

(54) ANGLE DETECTION OPTICAL SYSTEM, ANGLE DETECTION APPARATUS, OPTICAL SIGNAL SWITCH SYSTEM AND INFORMATION RECORDING AND REPRODUCTION SYSTEM

(75) Inventors: Koichi Takahashi, Hachioji (JP); Masaki Arai, Kawasaki (JP)

(73) Assignee: Olympus Corporation, Tokyo (JP)

( * ) Notice: Subject to any disclaimer, the term of this patent is extended or adjusted under 35 U.S.C. 154(b) by 279 days.

(21) Appl. No.: 10/743,725

(22) Filed: Dec. 24, 2003

(65) Prior Publication Data
US 2004/0189983 A1    Sep. 30, 2004

(30) Foreign Application Priority Data
Dec. 27, 2002    (JP)    ............ P2002-381816

(51) Int. Cl.
*G01B 11/26*    (2006.01)
*G01C 1/00*    (2006.01)
(52) U.S. Cl. .................................. 356/138
(58) Field of Classification Search ............. None
See application file for complete search history.

(56) References Cited

U.S. PATENT DOCUMENTS

| | | | | |
|---|---|---|---|---|
| 4,746,216 A | * | 5/1988 | Sommargren | 356/485 |
| 5,017,768 A | * | 5/1991 | Takagi | 250/201.5 |
| 5,392,112 A | * | 2/1995 | Nakamura | 356/139.1 |
| 5,889,593 A | * | 3/1999 | Bareket | 356/445 |
| 5,929,983 A | * | 7/1999 | Lu | 356/138 |
| 2001/0026363 A1 | * | 10/2001 | Brinkman et al. | 356/138 |
| 2002/0093723 A1 | * | 7/2002 | Okayama | 359/320 |
| 2003/0053742 A1 | * | 3/2003 | Maruyama | 385/18 |
| 2003/0179366 A1 | * | 9/2003 | Takahashi | 356/139.1 |

FOREIGN PATENT DOCUMENTS

| | | | |
|---|---|---|---|
| GB | 2 266 366 A | * | 10/1993 |
| JP | 8-227552 | | 9/1996 |
| JP | 11-144273 | | 5/1999 |
| JP | 11-144274 | | 5/1999 |

* cited by examiner

*Primary Examiner*—Michael P. Stafira
(74) *Attorney, Agent, or Firm*—Kenyon & Kenyon LLP

(57) ABSTRACT

A reflective surface for detection is provided in an object being detected. Laser light condensed by a condensing lens is emitted from a laser light source and angle detection is performed by performing angle detection of the reflected light. The reflected light is irradiated onto a beam splitter and the optical path thereof is split by an optical path splitting surface to form luminous flux spots on light receiving surfaces of two four section light receivers. Optical path lengths from the reflective surface for detection to the respective light receiving surfaces are changed enabling the angle detection sensitivity to be altered. In an angle detection apparatus, an optical signal switch system, and an information recording and reproduction system, it is possible to make multiple detections of an inclination angle of a detection object using a compact structure. Consequently, improvements in various performances such as apparatus reliability, inclination angle detection precision, and detection range can be achieved.

17 Claims, 11 Drawing Sheets

ANGLE DETECTION OPTICAL SYSTEM, ANGLE DETECTION APPARATUS, OPTICAL SIGNAL SWITCH SYSTEM AND INFORMATION RECORDING AND REPRODUCTION SYSTEM

BACKGROUND OF THE INVENTION

1. Field of the Invention

Priority is claimed on Japanese Patent Application No. 2002-381816, filed Dec. 27, 2002, the content of which is incorporated herein by reference.

The present invention relates an angle detection optical system to an angle detection apparatus, an optical signal switch system, and an information recording and reproduction system.

2. Description of Related Art

Conventionally, an angle detection apparatus is known that irradiates light from a predetermined position onto a reflective surface used for detection that is provided on a portion of a detection object, and then, by detecting the position of the reflected light, detects the angle from the predetermined position of the detected object.

For example, in Japanese Patent Application Unexamined Publication (JP-A) No. 8-227552 (pages 2–3, FIGS. 1–2) an optical apparatus is disclosed that is provided with a detecting apparatus whose light receiving surface is divided into four sections and that is designed to detect an angle between a disk (i.e., a disk shaped information recording medium) and an optical head in order to write information onto the disk, and to detect the thickness of a disk protective layer. The detection apparatus that is divided into four sections irradiates light from an optical element onto the disk and then receives reflected light from the disk. It then outputs electrical signals corresponding to the quantity of light received by the respective light receiving surfaces. The center position of the reflected light relative to the division center of the light receiving surfaces is then detected by relative ratios of the output electrical signals. The angle of the disk is then detected from the size of the positional shift in the radial direction of the disk. The thickness of the disk protective layer is detected from the size of the positional shift in the tangential direction of the disk.

In Japanese Patent Application Unexamined Publication (JP-A) No. 11-144274 (pages 3–4, FIGS. 6, 9) a deflection angle detection apparatus is described in which angle detection light is irradiated onto the rear surface of a galvanomirror, the reflected light therefrom is separated into two luminous fluxes using a luminous flux splitting unit that has a splitting surface in which the reflectance changes in accordance with the light angle of incidence, the light quantities of the two luminous fluxes are detected independently using respective optical detectors, and the deflection angle of the galvanomirror is detected from the difference in the outputs. This technology enables the detection sensitivity to be improved by calculating the difference of A–B using a detected output A, which increases as the angle of incidence relative to the separation surface decreases, and a detected output B, which decreases as the angle of incidence relative to the separation surface decreases.

In addition, for example, optical signal switch systems used in optical communication and information recording and reproduction systems that use lasers are known as systems that are equipped with the above type of angle detection apparatus and make use of the deflection angle control of light deflection elements.

However, in the technology described in JP-A No. 8-227552, because the relative ratios of outputs of the light receiving surface that is divided into four sections are used, the detection sensitivity at the center position of the light receiving spot and the detection range are restricted by the size of the spot diameter, and these two are in a trade-off relationship with each other. Accordingly, in order to broaden the detection range while improving the sensitivity of the detection of the disk inclination angle, it has been necessary to increase the distance between the disk and the optical device and to alter the amount of change of the light receiving position of the reflected light relative to the amount of change in the inclination angle.

In the technology described in JP-A No. 11-144274, the detection sensitivity of the inclination angle is improved, but the angle of incidence is in a linear relationship with the reflectance. In addition, because the characteristics of the reflection film directly affect the detection accuracy, the detection accuracy deteriorates unless the reflection film is manufactured with a high level of precision.

A high degree of reliability is demanded in an optical signal switching system and information recording and reproduction system that use the above described conventional angle detection apparatus as a deflection angle control apparatus. Therefore, there are cases when a backup angle detection apparatus is provided in case of a failure in the angle detection apparatus being used. Moreover, because deflection angle control that is highly accurate and is performed over a wide range is sought from these apparatuses, there are cases when the control operation is performed in two stages, namely, coarse tuning and fine tuning.

In such cases, it is only possible to provide two apparatuses in parallel for the above described type of conventional angle detection apparatus.

SUMMARY OF THE INVENTION

In accordance with a first aspect of the present invention, an angle detection optical system comprises: a light source that irradiates light onto a reflective surface for detection provided on a detection object; an optical path splitting element that splits reflected light that has been reflected by the reflective surface for detection into first and second luminous fluxes that are respectively propagated on at least first and second optical paths that are different from each other; a first optical detector that is placed on the first optical path so as to receive the first luminous flux; and a second optical detector that is distanced from the first optical detector and placed on the second optical path so as to receive the second luminous flux.

In accordance with a second aspect of the present invention, an angle detection apparatus comprises: a light source that irradiates light onto a reflective surface for detection provided on a detection object; an optical path splitting element that splits reflected light that has been reflected by the reflective surface for detection into first and second luminous fluxes that are respectively propagated on at least first and second optical paths that are different from each other; a first optical detector that is placed on the first optical path so as to receive the first luminous flux; a second optical detector that is distanced from the first optical detector and placed on the second optical path so as to receive the second luminous flux; and a signal processor that receives a first detection signal from the first optical detector and a second detection signal from the second optical detector and processes the first and second detection signals so as to generate an angle detection signal that corresponds to a magnitude of an inclination angle of the detection object.

In accordance with a third aspect of the present invention, an optical signal switch system comprises: at least one light deflection element that is provided on a detection object and switches optical paths of optical signals; a reflective surface that is provided on the detection object; a light source that irradiates light onto the reflective surface; an optical path splitting element that splits reflected light that has been reflected by the reflective surface into first and second luminous fluxes that are respectively propagated on at least first and second optical paths that are different from each other; a first optical detector that is placed on the first optical path so as to receive the first luminous flux; a second optical detector that is distanced from the first optical detector and placed on the second optical path so as to receive the second luminous flux; a signal processor that receives a first detection signal from the first optical detector and a second detection signal from the second optical detector and processes the first and second detection signals so as to generate an angle detection signal that corresponds to a magnitude of an inclination angle of the detection object; and a deflection angle control unit that controls a deflection angle of the light deflection element based on the angle detection signal supplied by the signal processor.

In accordance with a fourth aspect of the present invention, an information recording and reproduction system performs at least one of recording and reproduction of information signals. The information recording and reproduction system comprises: a light source that emits a first luminous flux; an optical system that forms an image of the first luminous flux on a recording surface of a recording medium; a light deflection element that is placed in the optical system, the light deflection element having a reflective surface that varies in an inclination angle depending upon a deflection angle of the first luminous flux that has been deflected in a plane that is parallel to the recording surface; a light source that irradiates light onto the reflective surface; an optical path splitting element that splits reflected light that has been reflected by the reflective surface into first and second luminous fluxes that are respectively propagated on at least first and second optical paths that are different from each other; a first optical detector that is placed on the first optical path so as to receive the first luminous flux; a second optical detector that is distanced from the first optical detector and placed on the second optical path so as to receive the second luminous flux; and a signal processor that receives a first detection signal from the first optical detector and a second detection signal from the second optical detector and processes the first and second detection signals so as to generate an angle detection signal that corresponds to a magnitude of an inclination angle of the detection object.

BRIEF DESCRIPTION THE DRAWINGS

DETAILED DESCRIPTION OF THE INVENTION

A description will now be given of embodiments of the present invention with reference made to the attached drawings. Note that the same descriptive symbols are given to members that are the same or have an equivalent function in all of the drawings. Accordingly, a description of members having the same descriptive symbol is omitted even if the embodiment is different.

FIRST EMBODIMENT

The angle detection apparatus according to the first embodiment of the present invention will now be described.

Figure 1:
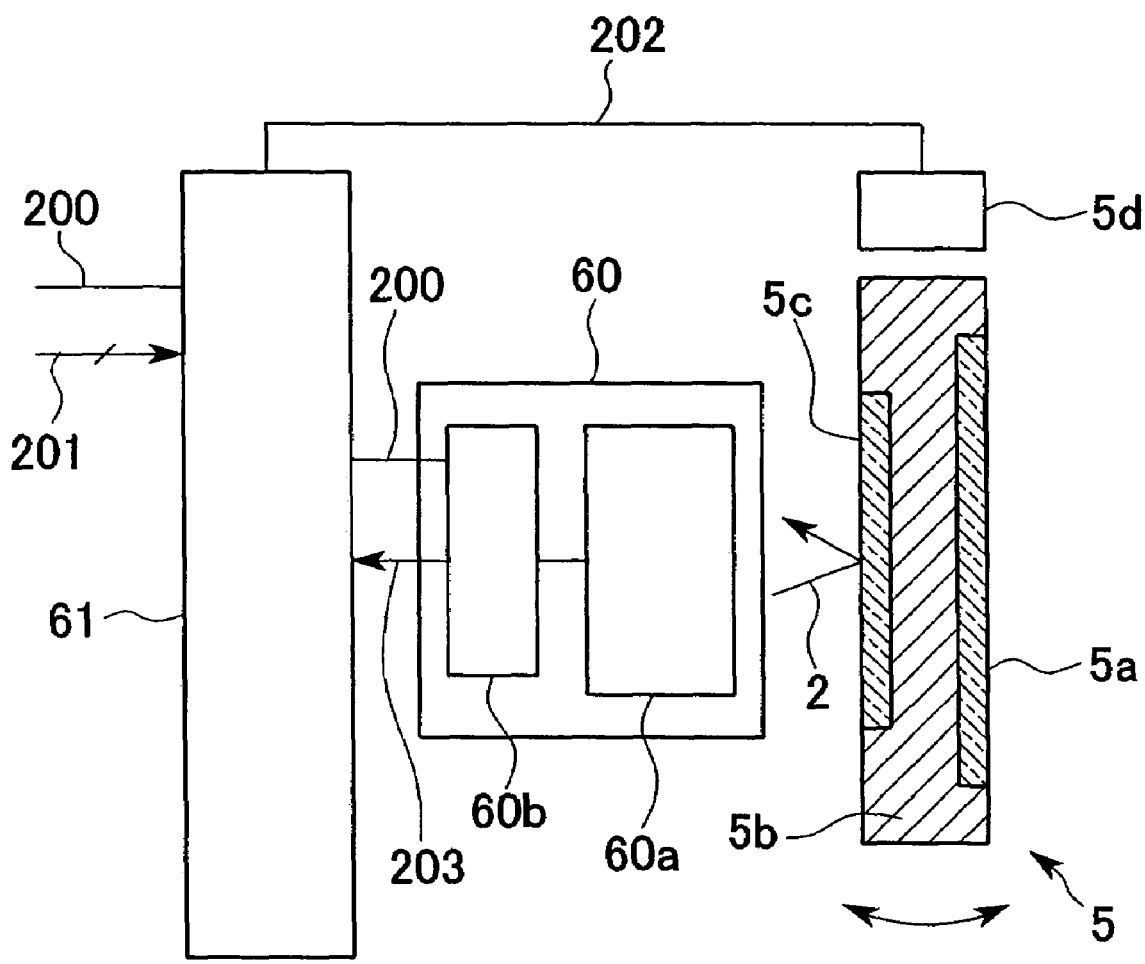
FIG. 1 is a conceptual view for explaining the angle detection apparatus according to the first embodiment of the present invention.
Figure 2:
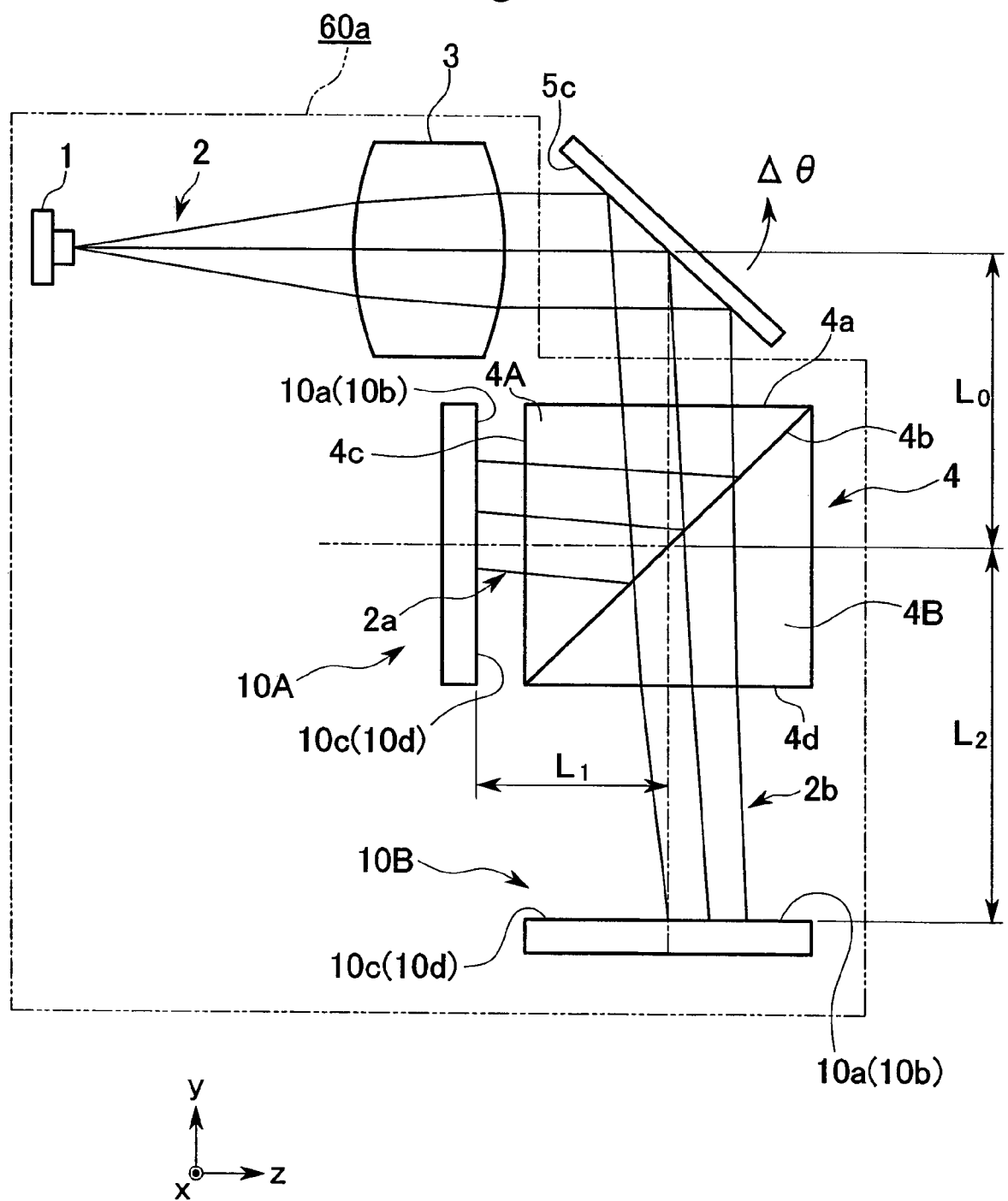
FIG. 2 is a schematic view of an optical path for explaining the schematic structure of a measurement optical system used in the angle detection apparatus according to the first embodiment of the present invention.

FIG. 1 is a conceptual view of an angle detection apparatus 60 according to a first embodiment of the present invention. FIG. 2 is a schematic view of an optical path for explaining the schematic structure of a measurement optical system 60*a* used in the angle detection apparatus 60.

The angle detection apparatus 60 according to the first embodiment of the present invention is formed by the measurement optical system 60*a* and a signal processing section 60*b*, and performs the following operation. Namely, laser light 2 emitted from the measurement optical system 60*a* is irradiated onto a reflective surface used for detection provided in the object of the angle detection (i.e., the detection object). Reflected light reflected from the reflective surface is then received by the measurement optical system 60*a*, and signal processing is performed on the received light signals by the signal processing section 60*b*. A detection level signal 203 corresponding to the size of the inclination angle of the reflective surface for detection is then output. In the example in FIG. 1 the detection object of the angle detection apparatus 60 is a rotation mirror 5 (i.e., an optical deflecting element).

The rotation mirror 5 is formed, for example, by a galvanomirror and is an integrated unit that includes surface reflective planar mirrors embedded on a front and rear surface of a planar supporting member 5b. A deflection mirror surface 5a for deflecting light is formed on a front surface side of the supporting member 5b, while a reflective surface for detection 5c that is used for performing angle detection is formed on a rear surface side of the supporting member 5b. The deflection angle of the deflection mirror surface 5a is able to be changed by a known actuator 5d such as an electromagnetic coil.

It is not necessary for the deflection mirror surface 5a and the reflective surface for detection 5c to be parallel, however, the reflective surface for detection 5c is bonded at an inclination so as to correspond to the deflection angle of the deflection mirror surface 5a. Namely, if the inclination angle of the reflective surface for detection 5c is detected, this can be converted into the deflection angle of the deflection mirror surface 5a.

The center of rotation of the rotation mirror 5 may be above the deflection mirror surface 5a, above the reflective surface for detection 5c, or between the two, however, to simplify the explanation given below, it may be understood that the center of rotation is above the reflective surface for detection 5c and the optical axis passes through the center of rotation, namely, there is no sag.

In the angle detection apparatus 60 the measurement optical system 60a is placed in a position facing the reflective surface for detection 5c. The detection level signal 203 is output to a deflection angle control unit 61 that controls a deflection angle of the deflection mirror surface 5a. A drive signal 202 is output from the deflection angle control unit 61 to the actuator 5d. Note that a power supply voltage 200 is supplied from a power supply (not shown) in order to drive the angle detection apparatus 60 and the deflection angle control unit 61.

Next, the angle detection apparatus 60 according to the present embodiment will be described in detail.

As is shown in FIG. 2, the measurement optical system 60a of the angle detection apparatus 60 is provided with a laser light source 1 (i.e., a light source), a condensing lens 3, a beam splitter 4 (i.e., an optical path splitting element), and four section light receivers 10A and 10B (i.e., optical detectors).

These will be described substantially in the order in which they are located on the optical path. Note that when a direction is mentioned, where necessary, the XYZ coordinate system is used. The XYZ coordinate system is a rectangular coordinate system used to describe optical paths. The Z axis is the optical axis of an optical system in which the direction the light moves in is the positive direction, and shows the optical path of the principal ray on the axis. The X axis is an axis orthogonal to the Z axis with a direction moving upwards from the surface of the paper (showing the drawing) being the positive direction. The Y axis is an axis rotated 90° in a clockwise direction around the X axis as seen from the positive direction of the Z axis.

The optical path in FIG. 2 is set by rotating the reflective surface for detection 5c by an angle of $\Delta\theta$ in an anticlockwise direction as seen from the positive direction of the X axis.

The laser light source 1 irradiates laser light 2 of a predetermined intensity onto the reflective surface for detection 5c. A semiconductor laser device, for example, can be used as the laser light source 1. The wavelength of the laser light source 1 can be appropriately selected in accordance with the reflectance of the reflective surface for detection 5c and wavelength sensitivity characteristics of the four section light receiver 10 and the like.

The condensing lens 3 condenses the laser light 2 and, in order to give it a spot diameter of a predetermined size on the light receiving surfaces of the four section light receivers 10A and 10B, matches the optical axis thereof with the optical axis of the laser light source 1. The condensing lens 3 has a positive power and is positioned upstream from the reflective surface for detection 5c.

It is also possible for a suitable aperture to be positioned between the laser light source 1 and the condensing lens 3, or downstream from the condensing lens 3 in order to shape the spot diameter.

The beam splitter 4 splits the optical path by reflecting a portion of the laser light 2 reflected by the reflective surface for detection 5c and transmitting the remainder. The beam splitter 4 is a square pillar shaped member formed by bonding two triangular prisms 4A and 4B to each other along one prism surface, and having an optical path splitting surface 4b formed by a half mirror at the bonded portion.

An entry surface 4a and a planar transmission surface 4c, which are prismatic surfaces on the prism 4A side, face, respectively, the reflective surface for detection 5c and the four section light receiver 10A (described below). A planar transmission surface 4d, which is one of the prismatic surfaces of the prism 4B, that is opposite the entry surface 4a faces the four section light receiver 10B (described below).

The material of the beam splitter 4 may, for example, be an appropriate nitrate material such as BK7, manufactured by Schott. However, if a nitrate material having a high index of refraction is used such as, for example, the S-TIH series, manufactured by Ohara, having an index of refraction $n_d$ of $n_d > 1.7$, this is more preferable as the optical path length is extended and the angle detection range is broadened while the structure is made more compact.

Figure 3:
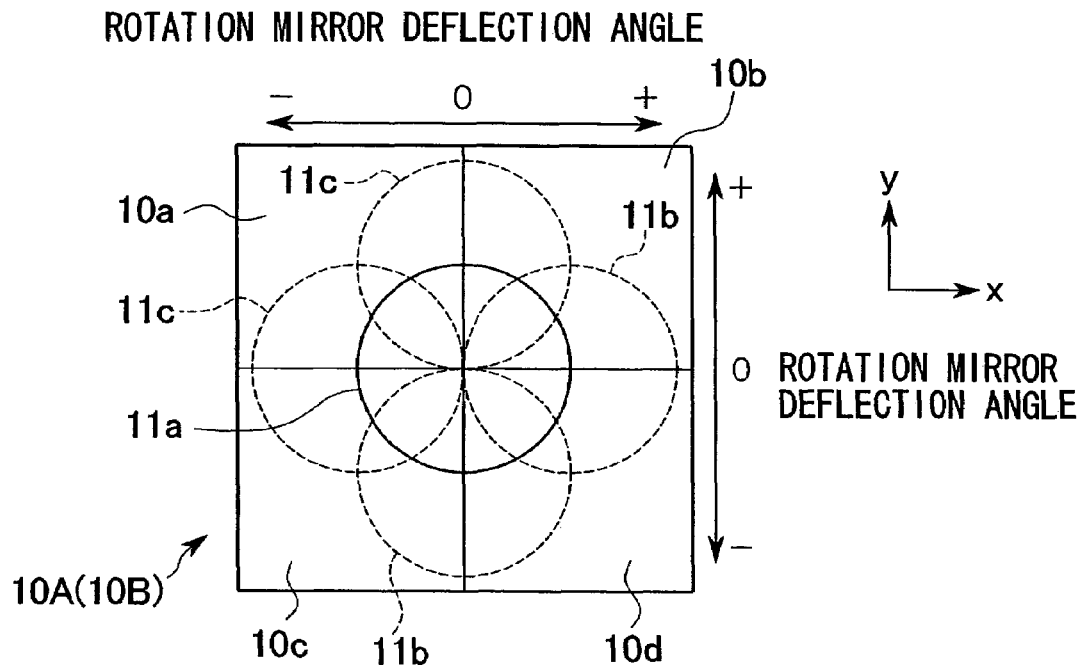
FIG. 3 is a typical view looking in the direction of the optical axis for explaining a four section optical receiver used in the first embodiment of the present invention.

The four section light receivers 10A and 10B detect the position of the center of the light quantity of the spot diameter on the light receiving surface, and the structures of each are substantially the same. FIG. 3 is a typical view as seen from the direction of the optical axis for explaining the four section light receiver 10A (10B).

The four section light receiver 10A (10B) is a light receiving element in which light receiving surfaces 10a, 10b, 10c, and 10d are placed adjacent to each other such that the boundaries of each form a cruciform configuration on the same plane. The light receiving surfaces 10a, 10b, 10c, and 10d are formed by photodiodes (hereinafter, abbreviated to PD) that are each able to independently detect light quantities. They are able to detect the quantity of laser light 2 irradiated onto their respective areas and to output a detection signal.

Each of the light receiving surfaces is positioned such that, as is shown in FIG. 3, if the position detection directions are taken as x and y directions, then, in the x direction, the light receiving surfaces 10a and 10b are placed adjacent to each other and the light receiving surfaces 10c and 10d are placed adjacent to each other. In the y direction, the light receiving surfaces 10a and 10c are placed adjacent to each other and the light receiving surfaces 10b and 10d are placed adjacent to each other. In addition, the light receiving surfaces 10a, 10b, 10c, and 10d are positioned such that they are substantially orthogonal to the optical axis when the reflective surface for detection 5c is in the center position and such that this optical axis passes through the intersection point of the cruciform boundaries.

The positions of the four section light receivers 10A and 10B in the optical axis directions are such that the optical path length from the principal plane of the condensing lens 3 is shorter than the focal distance of the condensing lens 3. In addition, the optical path lengths of each from the optical path splitting surface 4b are set as $L_1$ and $L_2$ (wherein $L_1 < L_2$).

The signal processing section 60b (see FIG. 1) is provided with an electrical circuit that emits light by driving the laser light source 1, supplies power to the four section light receivers 10A and 10B, acquires detection signals in accordance with the light quantity, performs appropriate signal processing on the detection signals such as amplification, shaping, and calculation processing, and outputs a detection level signal 203.

Next, the operation of the angle detection apparatus 60 will be described.

Laser light 2 that has been diverged as luminous flux having a predetermined quantity of light and has been emitted from the laser light source 1 undergoes a condensing operation in the condensing lens 3 and moves forward as convergent light. It is then reflected by the reflective surface for detection 5c and the optical path is changed. The laser light 2 that has been reflected by the reflective surface for detection 5c enters from the entry surface 4a into the beam splitter 4, passes through the triangular prism 4A, and arrives at the optical path splitting surface 4b. In the description below the optical path length from the reflective surface for detection 5c to the optical path splitting surface 4b is represented as the distance $L_0$.

A portion of the laser light 2 is reflected by the optical path splitting surface 4b and moves into the triangular prism 4A as splitting surface reflected light. This light is then irradiated to the outside of the beam splitter 4 from the planar transmission surface 4c. It then arrives on the light receiving surface of the four section light receiver 10A. At this time, the splitting surface reflected light 2a has become luminous flux having a predetermined spot diameter that corresponds to the optical path length from the principal plane of the condensing lens 3 to the light receiving surface.

The remainder of the luminous flux that passes through the optical path splitting surface 4b moves into the triangular prism 4B as splitting surface transmitted light, and is irradiated to the outside of the beam splitter 4 from the planar transmission surface 4d. It then arrives on the light receiving surface of the four section light receiver 10B. At this time, the splitting surface reflected light 2b has become luminous flux having a predetermined spot diameter that corresponds to the optical path length from the principal plane of the condensing lens 3 to the light receiving surface.

Namely, from the positional relationship between the four section light receivers 10A and 10B, the spot diameter on the light receiving surface of the four section light receiver 10A is larger than the spot diameter on the light receiving surface of the four section light receiver 10B.

When the reflective surface for detection 5c is in the center position the splitting surface reflected light 2a and the splitting surface transmitted light 2b move along their respective optical axes, and form a spot having its center at the position of the cruciform point of intersection on the light receiving surfaces of the four section light receivers 10A and 10B. FIG. 3 is a typical view seen from the optical axis direction showing this state. The symbol 11a shows the luminous flux spot in this case.

As is shown in FIG. 2, when the reflective surface for detection 5c rotates in the positive direction by the angle $\Delta\theta$ and the inclination angle changes, the splitting surface reflected light 2a and the splitting surface transmitted light 2b move in directions that are oblique by the size of the angle 2 $\Delta\theta$ relative to the respective optical axes of the splitting surface reflected light 2a and the splitting surface transmitted light 2b. The positions of the luminous flux spots on the four section light receivers 10A and 10B are accordingly displaced.

Next, the theory of the position detection of the four section PD will be described.

Outputs of the light receiving surfaces 10a, 10b, 10c, and 10d when a spot is irradiated onto the sensor light receiving surface 10 are taken respectively as A, B, C, and D. At this time, the output corresponding to the position in the x direction and the output corresponding to the position in the y direction can be obtained by performing the respective calculations $(A+C-B-D)/(A+B+C+D)$ and $(A+B-C-D)/(A+B+C+D)$. Detection signals obtained from these outputs are obtained as excellent linear responses provided that the spot configurations are uniform. If an excellent linear response cannot be obtained these outputs can be appropriately calibrated by the circuit of the signal processing section 60 or by calculation processing in accordance with the spot configuration and light distribution.

In the signal processing section 60b the inclination angles of the reflective surface for detection 5c are calculated based on a position shift amount that corresponds to the detection signal sent from the measurement optical system 60a and on a predetermined optical path length from the reflective surface for detection 5c to the four section light receivers 10A and 10B. Because the position shift amount is measured in two-dimensions, the inclination angles of the reflective surface for detection 5c are also respectively measured as two-dimensional inclination angles around the X and Y axes.

Figure 4:
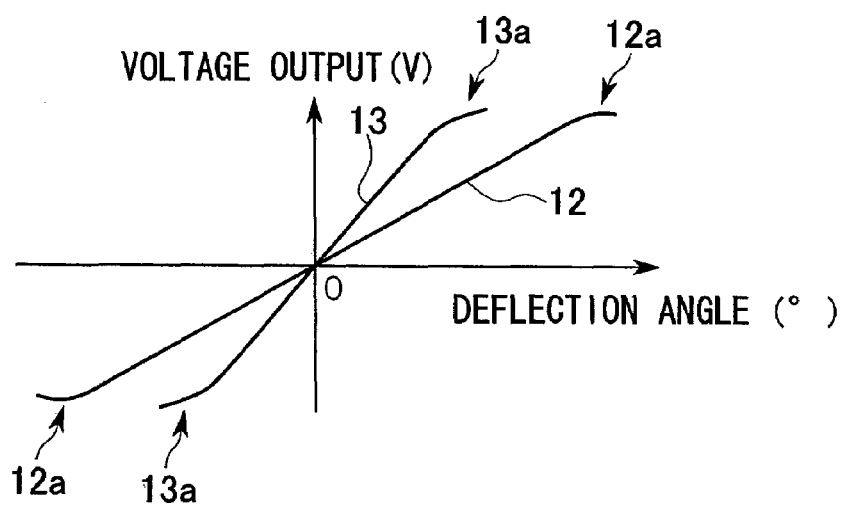
FIG. 4 is a graph showing an example of a detection signal of the four section optical receiver used in the first embodiment of the present invention.

FIG. 4 is a graph showing an example of this type of detection signal. The horizontal axis represents the deflection angle (i.e., the inclination angle of the reflective surface for detection 5c) of the rotation mirror 5 around the X axis, with the units being degrees (°). The vertical axis represents voltage output of the detection signals, with the units being volts (V).

Response curves 12 and 13 show detection signals from the respective four section light receivers 10A and 10B. Each line is a monotone increasing curve that passes through the point of origin, and a substantially linear change is shown by the major portion thereof. However, non-linear response areas 12a and 13a in which the inclination gradually flattens out are formed in the portions of each line where the absolute value of the deflection angle is a large value.

As regards the size of the detection signals, the response curve 12 is always smaller than the response curve 13. In contrast, as regards the detection range of the deflection angle, the response curve 12 is broader than the response curve 13. The reason for this is that, even if the deflection angle is the same, because the optical path length $(L_0+L_1)$ from the reflective surface for detection 5c to the light receiving surface of the four section light receiver 10A is shorter than the optical path length $(L_0+L_2)$ from the reflective surface for detection 5c to the light receiving surface of the four section light receiver 10B, the spot diameter on the light receiving surface of the four section light receiver 10A is larger and the size of the position shift on the light receiving surface is smaller.

Namely, in spite of the fact that the four section light receivers 10A and 10B are optical detectors having the same structure, the output of the four section light receiver 10A has the characteristics that the angle detection sensitivity is low and the detection range is wide. In contrast, the output of the four section light receiver 10B has the characteristics that the angle detection sensitivity is high and the detection range is narrow. Namely, it is possible to make a double measurement simultaneously using two optical detectors having different detection sensitivities of an angle change of a single detection object.

Accordingly, the advantage is gained that it is possible, for example, to use each four section light receiver for a different purpose such as using the four section light receiver 10A for rough adjustment angle detection and using the four section light receiver 10B for fine adjustment angle detection.

Moreover, regardless of the capability of making a double angle detection, because part of the optical path is shared with the laser light source 1, the advantage is gained that the device can be made more compact.

Moreover, for example, if a structure is employed in which the four section light receiver 10B is held such that it can move in a direction orthogonal to the optical axis using an actuator and microstage capable of precise movement and the like, then even if the deflection angle detected by the four section light receiver 10A is outside the detection range of the four section light receiver 10B, the four section light receiver 10B can be moved a predetermined distance such that the position of the spot of the luminous flux is within the detection range, so as to enable a more precise angle detection to be performed.

In the above described embodiment, the quantity of light reflected by the optical path splitting surface 4b and the quantity of light transmitted through the optical path splitting surface 4b may be an optional ratio if a four surface light receiver that obtains output ratios of the light receiving surfaces is used. However, in order to improve the angle detection accuracy even further, it is preferable that the ratio of the reflected light to the transmitted light is made substantially 1:1, and the S/N ratios of the four section light receivers 10A and 10B are equalized.

Next, variant examples according to the present embodiment will be described.

The first to third variant examples are structures in which, in the above described embodiment, optical surfaces having optical power are installed between the optical path splitting surface 4b and the four section light receivers 10A and 10B, and the spot diameter and amount of movement of the spot of the luminous flux on the light receiving surfaces of the four section light receivers 10A and 10B can be changed independently. A simple description will now be given of those points that differ from the above description.

Firstly, the first variant example will be described.

The angle detection apparatus 60 according to the first variant example of the present embodiment is provided with a measurement optical system 70a in place of the above described measurement optical system 60a.

Figure 5:
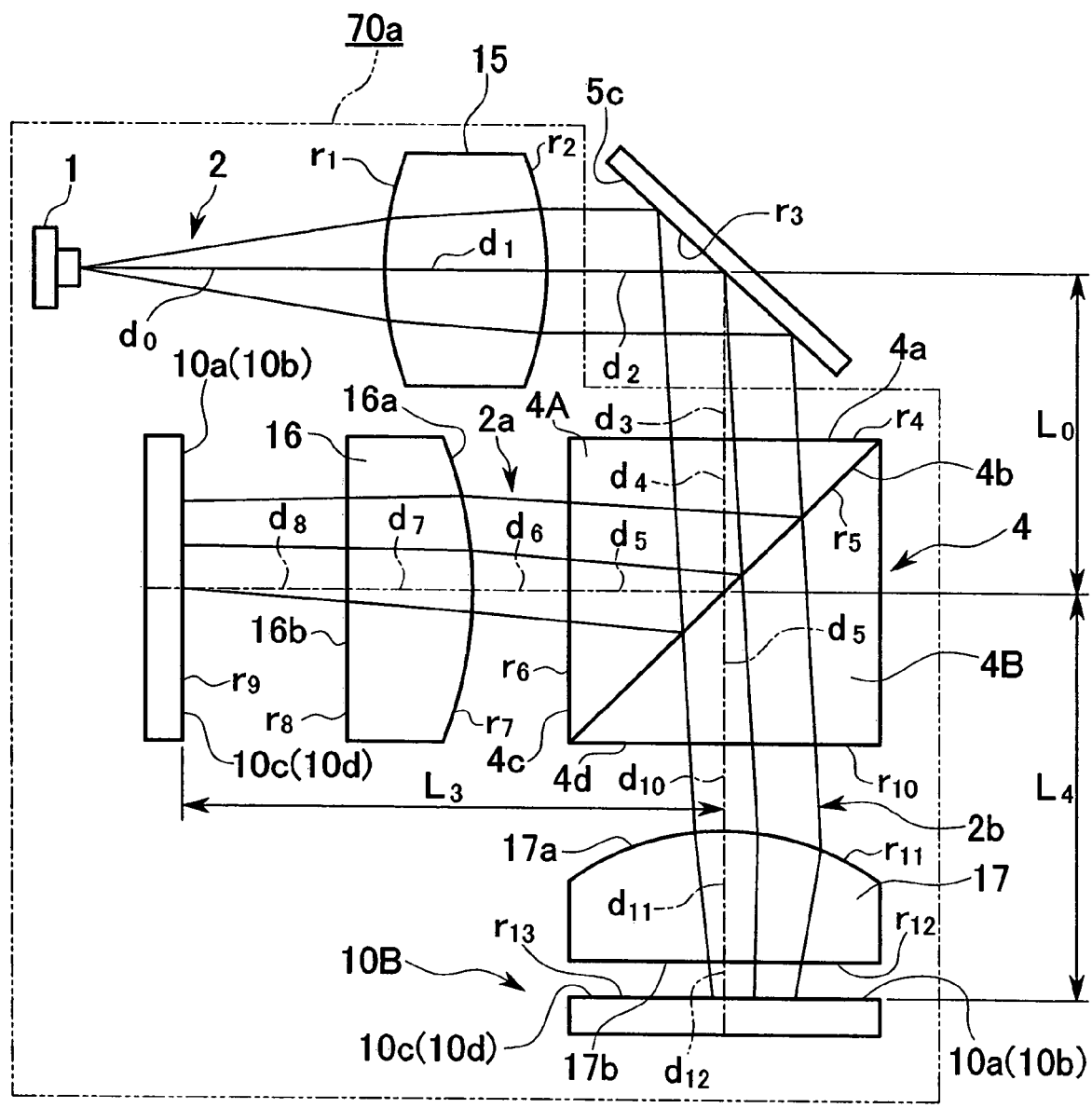
FIG. 5 is a schematic view of an optical path for explaining a measurement optical system according to a first variant example of the first embodiment of the present invention.

FIG. 5 is a schematic diagram of an optical path for explaining the measurement optical system 70a of the first variant example.

In this variant example, in the measurement optical system 60a, a collimate lens 15 is provided in place of the condensing lens 3 that changes laser light 2 emitted from the laser light source 1 into parallel luminous flux. In addition, a condensing lens 16 having a positive power is provided between the beam splitter 4 and the four section light receiver 10A, and a condensing lens 17 having a positive power is provided between the beam splitter 4 and the four section light receiver 10B. In addition, the light receiving surface of the four section light receiver 10A is placed at a position having the optical path length $L_3$ from the optical path splitting surface 4b, while the light receiving surface of the four section light receiver 10B is placed at a position having the optical path length $L_4$ from the optical path splitting surface 4b.

The condensing lenses 16 and 17 can be formed, for example, by plano-convex lenses. The focal distances and placement positions can be set such that the amounts of movement of the spots of the luminous flux on the light receiving surfaces of the four section light receivers 10A and 10B are each different relative to a predetermined angle change in the inclination angle of the reflective surface for detection 5c.

For example, the focal distance of the condensing lens 16 is set so as to be longer than the optical path length from the reflective surface for detection 5c to the principal plane of the condensing lens 16. In the same manner, the optical path length from the principal plane of the condensing lens 16 to the light receiving surface of the four section light receiver 10A is set so as to be shorter than the focal distance thereof. The focal distance of the condensing lens 17 is set so as to be shorter than the optical path length from the reflective surface for detection 5c to the principal plane of the condensing lens 17. In the same manner, the optical path length from the principal plane of the condensing lens 17 to the light receiving surface of the four section light receiver 10A is set so as to be shorter than the focal distance thereof. At this time, the spot diameter is set at a size that allows a suitable detection range to be obtained.

According to this type of structure, firstly, the laser light 2 emitted from the laser light source 1 is changed into parallel luminous flux by the collimate lens 15. It is then reflected by the detection reflection lens 5c and strikes the beam splitter 4 from the entry surface 4a. A portion thereof is then reflected by the optical path splitting surface 4b as splitting surface reflected light 2a, while the remainder is transmitted as splitting surface transmitted light 2b.

The splitting surface reflected light 2a is transmitted through and condensed by the condensing lens 16, and is irradiated onto the light receiving surface of the four section light receiver 10A having a predetermined spot diameter. The splitting surface transmitted light 2b is transmitted through and condensed by the condensing lens 17, and is irradiated onto the light receiving surface of the four section light receiver 10B having a predetermined spot diameter.

Because the amounts of movement of the spots of the luminous flux relative to the predetermined inclination angle change are different on the respective light receiving surfaces, even if the same device is used for the four section light receivers 10A and 10B, it is possible to change the sensitivity of the angle detection of the inclination angle. Namely, detection signal characteristics such as those shown in FIG. 4 can be obtained.

Furthermore, according to the present variant example, the advantage is obtained that, because the angle detection sensitivity and the placement position on the light receiving surface can be changed freely and independently of each other by changing the powers of each of the condensing lenses 16 and 17, the degree of freedom when arranging the layout of the components is increased.

Next, the second variant example will be described.

The angle detection apparatus 60 according to the second variant example of the present embodiment is provided with a measurement optical system 71a in place of the above described measurement optical system 60a.

Figure 6:
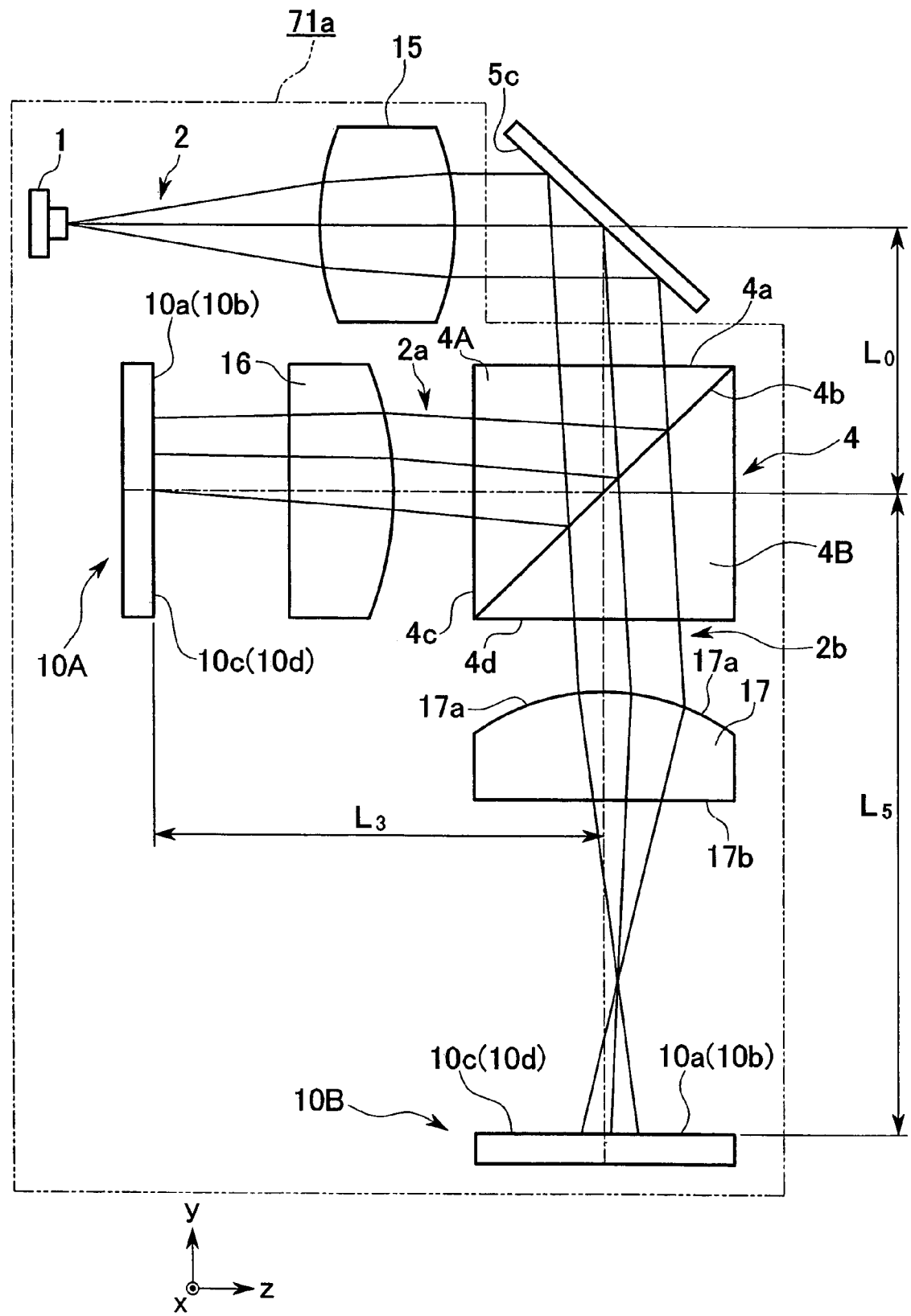
FIG. 6 is a schematic view of an optical path for explaining a measurement optical system of the angle detection apparatus according to a second variant example of the first embodiment of the present invention.

FIG. 6 is a schematic view of an optical path for explaining the measurement optical system 71a of the second variant example.

In the measurement optical system 71a, the position in the above described measurement optical system 71a of the four section light receiver 10B is shifted in the optical axis direction and is placed at a position having an optical path length $L_5$ from the optical path splitting surface 4b. The optical path length $L_5$ is set such that the optical path length from the principal plane of the condensing lens 17 to the light receiving surface of the four section light receiver 10B is longer than the focal distance of the condensing lens 17.

According to the above described structure, splitting surface transmitted light 2b is condensed by being transmitted through the condensing lens 17 and an image is formed at the focal position. The splitting surface transmitted light 2b is then irradiated onto the light receiving surface of the four section light receiver 10B with the spot diameter in an enlarged state. Accordingly, in the same way as in the first variant example, because it is possible to change the amount of movement of the spot on the respective light receiving surfaces relative to a predetermined inclination angle change on the respective light receiving surfaces, the sensitivity of the inclination angle detection can be changed even when the same device is used for the four section light receivers 10A and 10B.

At this time, because the light receiving surface of the four section light receiver 10B is positioned further away than the focal distance of the condensing lens 17 and receives a refraction action of the lens, the amount of movement on the light receiving surface relative to the predetermined inclination angle change is less than in the case of the first variant example. Therefore, if the spot diameter is the same, the angle detection range can be broadened.

Next, the third variant example will be described.

The angle detection apparatus 60 according to the third variant example of the present embodiment is provided with a measurement optical system 72a in place of the above described measurement optical system 60a.

Figure 7:
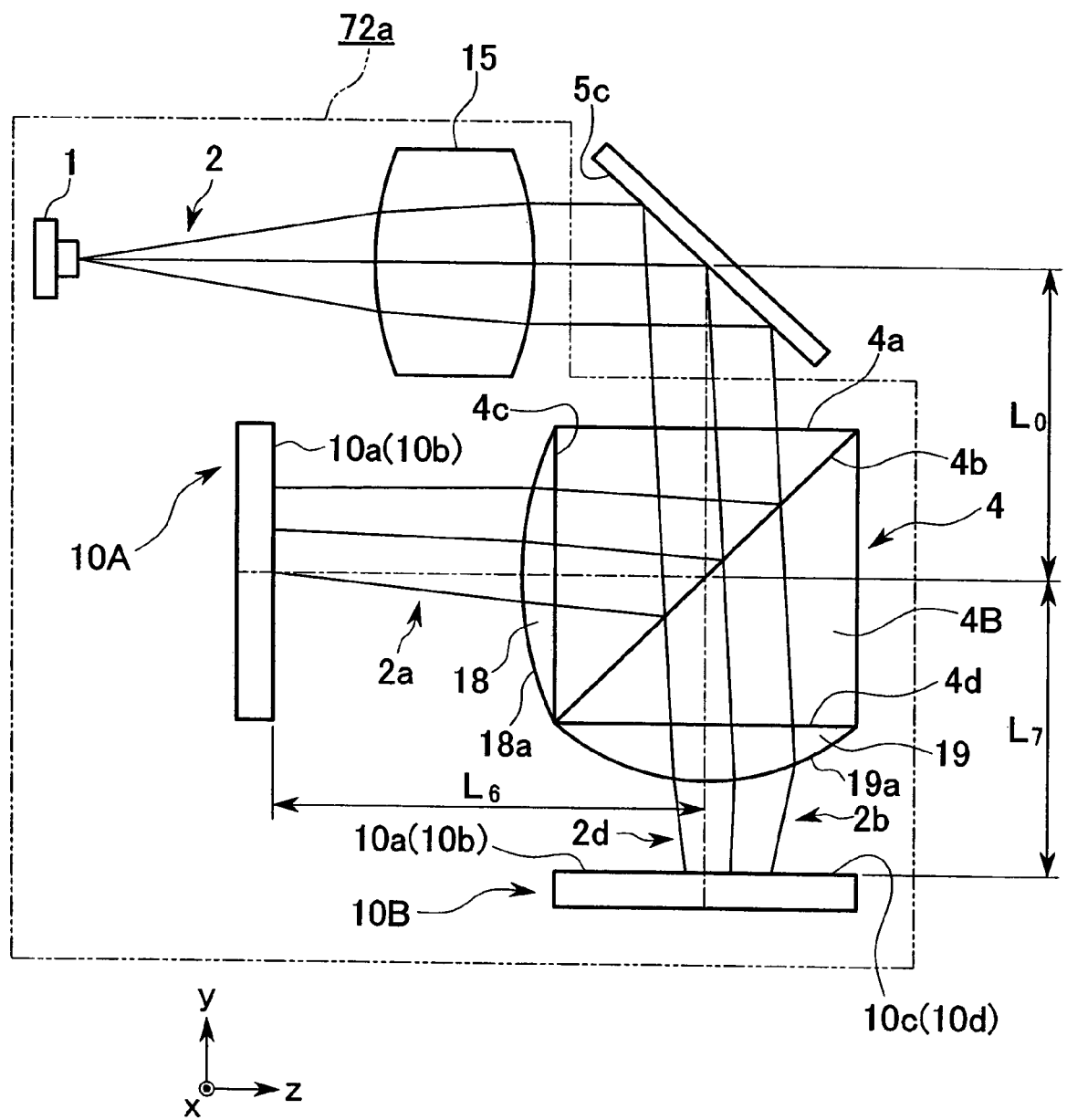
FIG. 7 is a schematic view of an optical path for explaining a measurement optical system of the angle detection apparatus according to a third variant example of the first embodiment of the present invention.

FIG. 7 is a schematic view of an optical path for explaining the measurement optical system 72a of the third variant example.

This variant example is provided with condensing lenses 18 and 19 that each have positive power in place of the condensing lenses 16 and 17 of the measurement optical system 71a. The condensing lenses 18 and 19 are each formed by plano-convex lenses and the flat surfaces of each are fixed by adhesion or the like respectively to the planar transmission surface 4c and the planar transmission surface 4d. In FIG. 7, the symbols 18a and 19a both indicate convex lens surfaces (i.e., optical surfaces having positive power).

The focal distance of the condensing lens 18 is longer than the focal distance of the condensing lens 19 and the optical path lengths from the respective principal planes thereof to the four section light receivers 10A and 10B are set as shorter distances than the respective focal distances thereof, and also the optical path lengths from the optical path splitting surface 4b are set at $L_6$ and $L_7$ (wherein $L_6 > L_7$) so that predetermined spot diameters are formed respectively on the light receiving surfaces.

According to this structure, the splitting surface reflected light 2a is condensed by being transmitted through the condensing lens 18, and is irradiated onto the light receiving surface of the four surface light receiver 10A. On the other hand, the splitting surface transmitted light 2b is condensed by being transmitted through the condensing lens 19, and is irradiated onto the light receiving surface of the four section light receiver 10B.

Because it is possible to change the amounts of movement of the spots of the luminous flux on the respective light receiving surfaces relative to a predetermined inclination angle change by changing the focal distances of the condensing lenses 18 and 19 and the positions where the light receiving surfaces are placed, the sensitivity of the inclination angle detection can be changed even when the same device is used for the four section light receivers 10A and 10B.

Moreover, because the condensing lenses 18 and 19 are formed integrally with the beam splitter 4, the advantage is obtained that the optical system can be made more compact.

Next, the fourth variant example will be described.

The angle detection apparatus 60 according to the fourth variant example of the present embodiment is provided with a measurement optical system 73a in place of the above described measurement optical system 60a.

Figure 8:
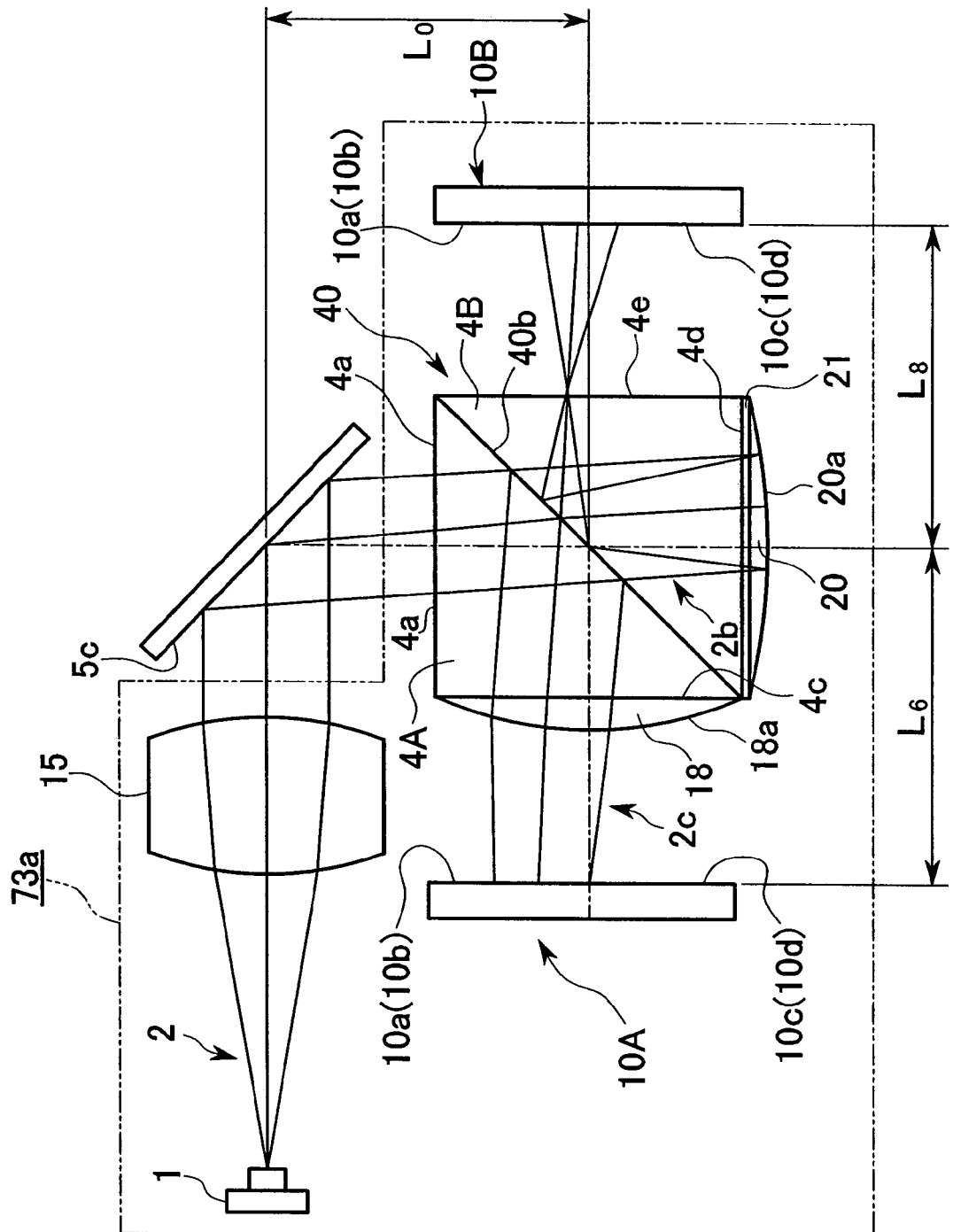
FIG. 8 is a schematic view of an optical path for explaining a measurement optical system of the angle detection apparatus according to a fourth variant example of the first embodiment of the present invention.

FIG. 8 is a schematic view of an optical path for explaining the measurement optical system 73a of the fourth variant example.

In this variant example, in the measurement optical system 72a a polarization beam splitter 40 is provided in place of the beam splitter 4, and a ¼ wavelength plate 21 and concave reflective element 20 are provided in place of the condensing lens 19.

The four section light receiver 10B is positioned so as to face the four section light receiver 10A on an optical axis of the splitting surface transmitted light 2b that is reflected by the concave reflective element 20 and then reflected by the polarization splitting surface 40b (described below).

The polarization beam splitter 40 is provided with the polarization splitting surface 40b, in which the transmittance is changed by a polarization component of the laser light 2, in place of the optical path splitting surface 4b of the beam splitter 4. In the same manner as in the third variant example, a condensing lens 18 is adhered to the planar transmission surface 4c.

There are no particular restrictions as to the type of polarization splitting surface 40b provided that it is capable of splitting the laser light 2 using a polarization component, however, it is preferable that a structure is employed in which 100% of one of the P polarization component or of the S polarization component is transmitted and 100% of the other of the S polarization component or of the P polarization component is reflected. Such reflection characteristics can be obtained by performing a suitable multilayer film coating process. In the description below a case in which 100% of the P polarization component is transmitted and 100% of the S polarization component is reflected is described.

A ¼ wavelength plate 21 that converts between linearly polarized light and circularly polarized light is provided on the planar transmission surface 4d.

The concave reflective element 20 may be formed, for example by providing a reflective film coating on the convex surface of a plano-convex lens so as to form a rear surface reflective element.

The four section light receiver 10B is placed at a position having an optical path length $L_8$ from the polarization splitting surface 40b. This position is such that, on an optical path of reflected light from the concave reflective element 20 that is then reflected by the polarization splitting surface 40b, the optical path length from the principal plane of the concave reflective element 20 is longer than the focal distance of the concave reflective element 20.

In this type of structure, 100% of the S polarization component of laser light 2 that is reflected by the reflective surface for detection 5c is reflected by the polarization splitting surface 40b and forms polarization splitting surface reflected light 2c. This polarization splitting surface reflected light 2c then passes through the planar transmission surface 4c and the condensing lens 18, and forms a spot on the four section light receiver 10A.

In contrast, polarization splitting surface transmitted light 2d formed by the P polarization component that is transmitted through the polarization splitting surface 40b is transmitted through the ¼ wavelength plate 21 so as to become circularly polarized light. This light then moves into the concave reflective element 20 and is reflected by the concave reflective surface 20a while undergoing a condensing action. The light is then irradiated once again onto the ¼ wavelength plate 21.

When the light is transmitted through the ¼ wavelength plate 21, the circularly polarized light is converted into an S polarization component. As a result, it is 100% reflected by the polarization splitting surface 40b, passes through the planar transmission surface 4e, and forms a spot on the four section light receiver 10B. At this time, because the focal distance of the concave reflective element 20 is in front of the four section light receiver 10B, due to the relationship between optical path lengths, the angle detection range can be broadened in the same way as in the second variant example.

According to this variant example, because it is possible, by changing the focal distance of the concave reflective element 20 and the placement positions of the four section light receivers 10A and 10B, to change the amount of movement of the spot on the respective light receiving surfaces relative to the predetermined inclination angle change of the reflective surface for detection 5c, the sensitivity of the inclination angle detection can be changed even when the same device is used for the four section light receivers 10A and 10B.

Moreover, because the condensing lenses 18 and 20 are formed integrally with the beam splitter 4, the advantage is obtained that the optical system can be made more compact.

Furthermore, by folding the optical path beyond the polarization splitting surface 40b using the concave reflective element 20 and the polarization beam splitter 40, the advantage is obtained that the device can be contained in a more compact space.

In addition, because the polarization splitting surface 40b transmits 100% of the P polarization component and reflects 100% of the S polarization component, because light loss from the polarization splitting surface 40b is done away with by providing the ¼ wavelength plate 21, the advantages are obtained that, even though the optical path is folded and compact, there is no light loss and angle detection can be performed at a high S/N ratio.

Note that in the descriptions of the third and fourth variant examples, as optical surfaces having positive power that are formed integrally with the beam splitter 4 and the polarization beam splitter 40, structures are described in which plano-convex lenses are adhered, however, these optical surfaces may also be formed directly on the bean splitter 4 or polarization beam splitter 40. If this type of structure is employed, no adhesion is required, thereby further reducing light loss and providing the advantage that the labor required to perform the adhesion can be excluded.

Provided that these optical surfaces have a positive power, then they are not limited to spherical lenses and Fresnel lens surfaces and holographic element surfaces may also be used. If such a structure is employed the thickness of the lens may be reduced.

Note also that in the above described first embodiment, descriptions are given of structures in which, in order to make the angle detection sensitivities different, the optical path lengths from the reflective surface for detection 5c to the four section light receivers 10A and 10B of each angle detection apparatus are different. However, it is also possible, for example, in order to improve the reliability of the angle detection apparatus, in applications in which two optical detectors are provided and the like, to employ a structure in which the optical path lengths are made the same in each and exactly the same optical detector is used for both the four section light receiver 10A and the four section light receiver 10B.

If this type of structure is employed, because it is possible to perform a double position detection on laser light 2 reflected by the reflective surface for detection 5c under exactly the same conditions, if there is a failure in one optical detector the other optical detector becomes a backup simply by being used as it is, thereby allowing an improvement in the reliability of the angle detection apparatus to be achieved.

At this time, because part of the optical path is shared with the laser light source 1, the advantage is obtained that the device can have a more compact structure than when two independent angle detection apparatuses are used.

Moreover, in the above description of the first embodiment, examples are described in which the beam splitter 4 and the polarization beam splitter 40 are used as optical path splitting elements, however, it is also possible, for example, to use a flat plate having as an optical path splitting surface a half mirror surface on which a coating has been provided that reflects substantially 50% of irradiated light and transmits substantially 50% of irradiated light.

By employing this type of structure, the optical path splitting element can be made lower in cost and lighter in weight compared with a beam splitter and the like.

In the above description of the first embodiment, an example is described in which four section light receivers 10A and 10B are used as optical detectors, however, the optical detectors are not restricted to these provided that optical detecting elements, sensors, and the like capable of detecting a center position of luminous flux spots are used.

For example, it is possible to use a position sensitive detector (PSD) that, when a spot of laser luminous flux is irradiated onto a light receiving surface of a sensor, detects the position of the spot by generating output voltage corresponding to the position of the center of the optical intensity of the spot.

Figure 9:
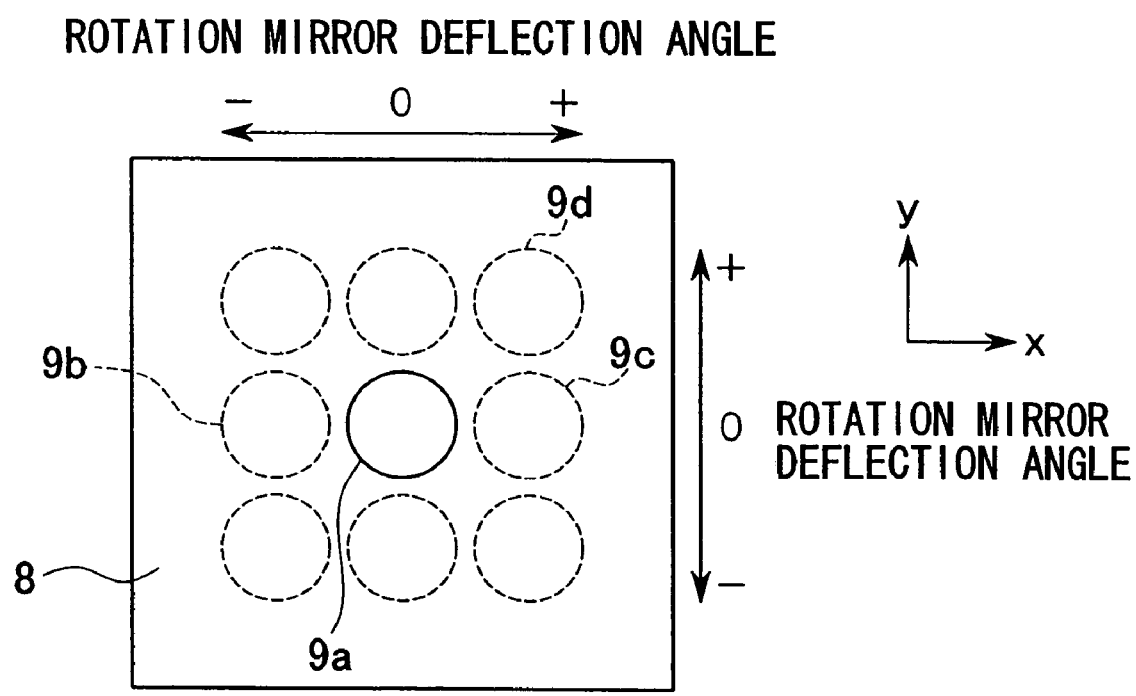
FIG. 9 is a typical view looking in the optical axis direction for explaining a position detection of a luminous flux spot using two-dimensional PSD.

FIG. 9 is a typical view seen from the direction of the optical axis for explaining the detection of the position of spots of luminous flux using a two-dimensional PSD. The symbol 8 is the light receiving surface of the sensor. The symbols 9a, 9b, 9c, and 9d represent luminous flux spots. When the spots move when the reflective surface for detection 5c is tilted in two axial directions, the positions thereof are detected when an output voltage is generated corresponding to the center position of the light intensity. By detecting the respective positions in the x and y directions, the components of the inclination angles (deflection angles) around the two axes of the reflective surface for detection 5c are detected.

According to this type of PSD, the advantage is obtained that, because it is possible to detect the position regardless of where the spots of luminous flux strike the light receiving surface, unlike a four section light receiver, the light receiving surface can be effectively used even if the spot diameter is small.

Accordingly, it is also possible, for example, to employ a combination of both types by using a PSD in order to broaden the angle detection range, and using a four section light receiver in order to increase angle detection accuracy.

As examples of types other than PSD, it is also possible to employ a two-dimensional charge-coupled device (CCD) that detects the optical intensity distribution at each pixel on a sensor. According to a two-dimensional CCD, the advantage is obtained that, even if there is a bias in the intensity distribution, because it is possible to accurately calculate the optical intensity center by performing image processing on suitable pixel signals, the angle detection accuracy can be improved.

Moreover, in the above description of the first embodiment, a description is given of when two light receivers have the same sensitivity characteristics, however, it is also possible to change the sensitivity characteristics of the two light receivers. If this is done, the advantage is obtained that it becomes easy to provide a difference between the angle detection sensitivities of each one using a synergistic effect obtained by a combination with the amounts of movement of the luminous flux spots and the like.

Moreover, in the above description of the first embodiment, an example is described in which a condensing lens and the like having a positive power is provided as an optical element having power between the optical path splitting element and the optical detector, however, provided that the optical element has power, then a Fresnel lens or holographic optical element may also be used. By using such optical elements the thickness of the element can be reduced thereby providing the advantage that the optical system can be made more compact.

Moreover, in the above description of the first embodiment, the power of an optical element or optical surface having power may also be a negative power as necessary.

Moreover, in the above description of the first embodiment, a description is given of when the laser light source 1 is used as a light source. Because the laser light source 1 is excellent for light harvesting monochromatic light, the advantage is obtained that the position detection accuracy can be improved. However, it is to be understood that provided the light source can be detected by an optical detector then the light source is not limited to the laser light source 1. For example, an LED element may also be used.

Moreover, in the above description of the first embodiment, an example is described in which the optical path is split into two and a double angle detection is performed, however, it is also possible to split the optical path into two or more paths and provide optical detectors for each path so as to perform multiple angle detection.

Moreover, the angle detection apparatus of the above described first embodiment can perform angle detection regardless of the type of object being detected as long as that a reflective surface for detection can be provided, and the application thereof is not limited to the detection of a deflection angle of a rotation mirror.

Moreover, in the above description of the first embodiment, a description is given of when the optical path splitting element is provided with an optical path splitting surface that splits light into optical paths of reflected light and transmitted light, however, it is also possible to split the optical path of transmitted light using, for example, wavelength differences or double refraction.

SECOND EMBODIMENT

Next, the optical signal switch system according to the second embodiment of the present invention will be described.

Figure 10:
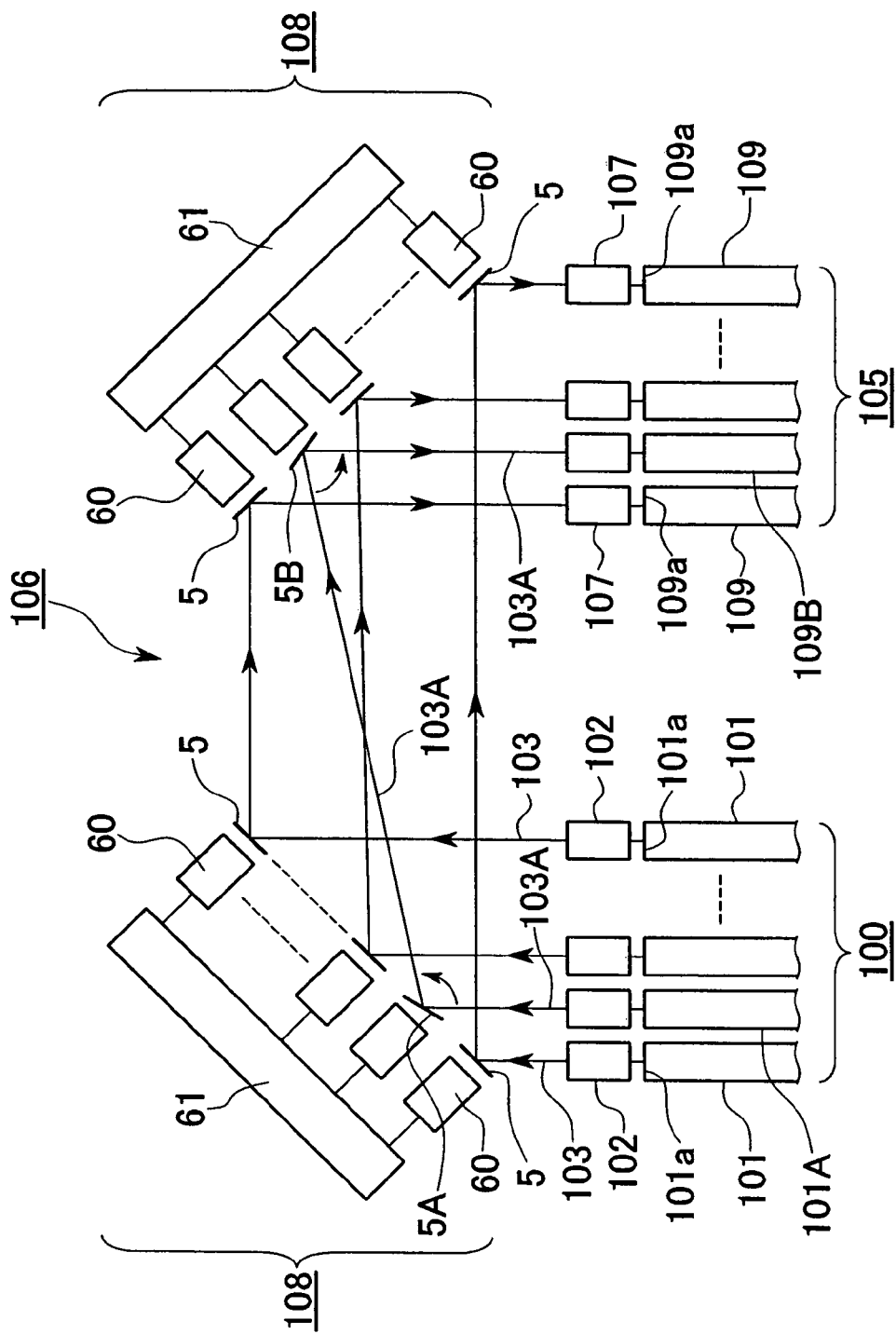
FIG. 10 is an explanatory schematic view for explaining the schematic structure of the optical signal switch system according to the second embodiment of the present invention.
Figure 11:
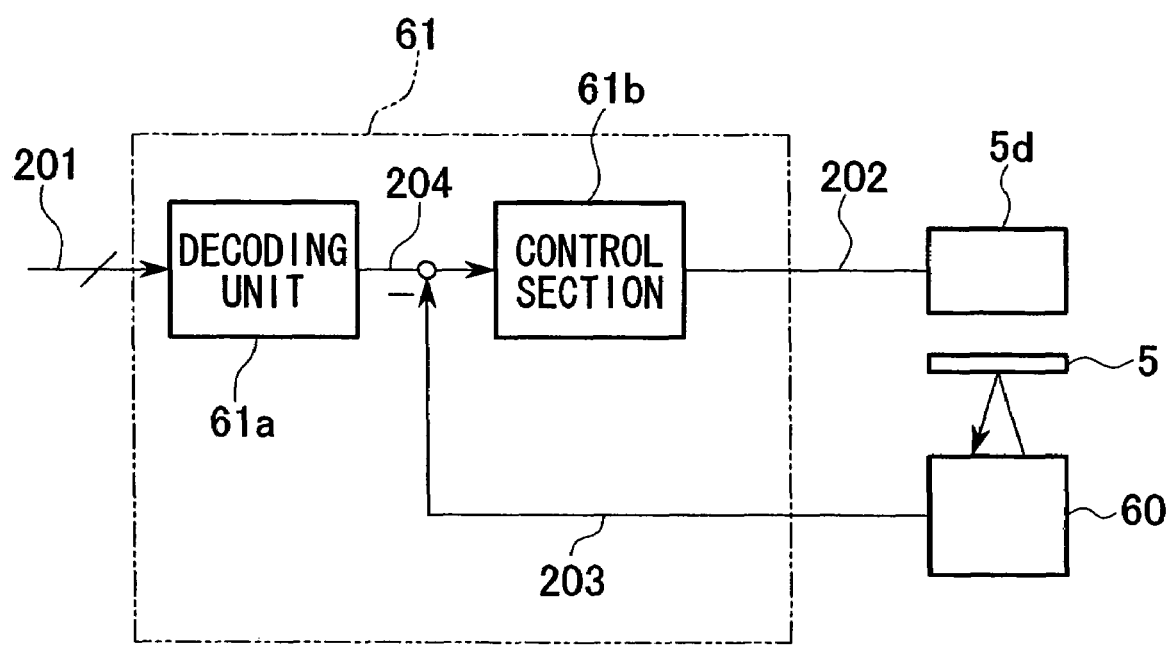
FIG. 11 is a control block diagram for explaining the outline of the angle control used in the optical signal switch system according to the second embodiment of the present invention.

FIG. 10 is a schematic explanatory view for explaining the schematic structure of the optical signal switch system 106 according to the second embodiment of the present invention. FIG. 11 is a control block diagram for explaining the outline of the angle control used in the optical signal switch system 106.

This system includes an input side cable unit 100 formed by a bundle of optical transmission cables such as optical fiber cables inside which is transmitted laser luminous flux 103 . . . (i.e., optical signals) whose intensity, pulse width, frequency and the like is modulated in accordance with information signals, an output side cable unit 105 formed by a bundle of optical transmission cables such as optical fiber cables inside which is transmitted laser luminous flux 103 . . . , and optical switching devices 108 and 108 that are provided between these units and that selectively deflect the luminous flux 103 . . . .

The input side cable unit 100 is formed by bundling at an end portion of optical transmission cables, which are formed by optical fiber cables constructed, for example, by providing a protective covering of plastic on a spun glass fiber, a plurality of input side cables 101 that have exit apertures 101a that allow laser beams 103 transmitted inside the cables 101 to exit. A collimate unit 102 that functions so as to form laser beams 103 into parallel beams is provided on optical axes of the respective exit apertures 101a. In the input side cables 101, the exit directions of each of the exit apertures 101a . . . are made uniform, and the exit apertures 101a . . . are regulated so as to be positioned at a predetermined interval. In accordance with the number thereof, the exit apertures 101a . . . are arranged in a matrix configuration formed by 2×2 or 64×64 apertures.

In the same way, the output side cable unit 105 is formed by bundling at an end portion of the optical transmission cables a plurality of output side cables 109 that have entry apertures 109a that allow laser beams 103 to enter. An imaging unit 107 that functions so as to perform imaging processing on the laser beams 103 is provided on the optical axes of the respective entry apertures 109a. In the output side cables 109, the entry directions of each of the entry apertures 109a . . . are made uniform, and the entry apertures 109a . . . are regulated so as to be positioned at a predetermined interval. In accordance with the number thereof, the entry apertures 109a . . . are arranged in a matrix configuration formed by 2×2 or 64×64 apertures.

Optical switching devices 108 are placed in each of the directions of exit and entry of the laser beam 103 in the input side cable unit 100 and the output side cable unit 105. The optical switching devices 108 are formed by rotation mirrors 5 (i.e., light deflection elements) that are each capable of being inclined independently either one-dimensionally or two-dimensionally, angle detection apparatuses 60 . . . that detect an inclination angle (i.e., a deflection angle) from a neutral position of each rotation mirror 5, and a deflection angle control unit 61 that controls deflection angles of the rotation mirrors 5 using outputs from the angle detection apparatuses 60.

The angle detection apparatuses 60 are those described in the first embodiment of the present invention.

The rotation mirrors 5 may, for example, have a structure such as that shown in FIG. 1 that was described in the first embodiment of the present invention.

The optical switching devices 108 and 108 have a positional relationship in which the respective rotation mirrors 5 are positioned to correspond to the respective exit apertures 101a . . . and 109a . . . , and when the inclination of the rotation mirrors 5 is in a neutral position, laser beams 103 emitted from a predetermined exit aperture 101a are reflected by the respective rotation mirrors 5 and 5, and enter into a predetermined entry aperture 109a.

A deflection mirror surface 5a is provided in the direction in which the laser beams 103 . . . enter in the rotation mirrors 5, and angle detection apparatuses 60 that detect deflection angles are provided facing rear surface side reflective surface for detections 5c . . .

The deflection angle control unit 61 is formed by a decoding unit 61a that decodes deflection angle control signals 201 specifying deflection angles and generates target level signals 204 corresponding to a target deflection angle of the rotation mirror 5, and a control section 61b that receives a deflection difference between a detection level signal 203 from the angle detection apparatus 60 and a target level signal 204, and generates a drive signal for the actuator 5d.

A deflection angle control signals 201 specifying the rotation mirror 5 and the deflection angle thereof and a power supply voltage 200 are received from the outside and are electrically connected respectively to the actuator 5d and the angle detection apparatus 60. A drive signal 202 that drives the actuator 5d is then output, and a detection level signal 203 is input from the angle detection apparatus 60 that detects a deflection angle of the rotation mirror 5.

Next, the operation of the optical signal switch system 106 will be described.

Firstly, in a normal relay state of the transmission path, laser beams 103 transmitted inside a single input side cable 101 arrive at one of the exit apertures 101a . . . regulated in a matrix arrangement, and are discharged therefrom to the outside of the input side cable 101. The discharged light is then condensed by the collimator unit 102 and is formed into a parallel beam having an appropriate thickness such that shading caused by dust and the like does not occur. The parallel beam is then emitted in the direction of the optical switching device 108.

Here, the rotation mirrors 5 that are provided downstream from each collimator unit 102 and that are in a neutral position reflect specific laser beams 103 towards a specific rotation mirror 5 in a neutral position of the other optical switching device 108.

These laser beams 103 are then irradiated into one of the imaging units 107 . . . that corresponds to a specific entry aperture 109a . . . of the output side cable unit 105 regulated in a matrix arrangement. The laser beams 103 are then transmitted through the relevant imaging unit 107, and are imaged onto the entry aperture 109a of a predetermined optical cable 101 of the output side cable unit 105. The laser beams 103 are then irradiated inside and transmitted along the predetermined cable 101.

In the optical signal switching system 106 according to the present embodiment, switching is performed by altering the arrival position of the laser beams 103 by inclining the rotation mirrors 5 and 5 from a neutral position by a predetermined deflection angle amount. For example, in FIG. 10, if laser beams 103A emitted from a specific input side cable 101A are switched from a normal relay state and are switched over to the output side cable 109B, then, firstly, the deflection angle of the rotation mirror 5A is changed and the laser beams 103A are deflected towards the rotation mirror 5B. In a normal relay state, the rotation mirror 5B in a neutral position irradiates other laser beams 103 into the output side cable 109B, however, in this case, the deflection angle of the rotation mirror 5B is altered to correspond to the angle of incidence of the laser beams 103A such that the laser beams 103A are irradiated into the output side cable 109B.

Because the exit apertures 101a . . . and the entry apertures 109a . . . are each regulated in a matrix configuration, the deflection angles of the rotation mirrors 5 and 5 that correspond respectively to the exit aperture 101a and the entry aperture 109a are determined in advance by the positional relationship between the optical switching devices 108 and 108. Therefore, by inclining specific rotation mirrors 5 and 5 to a predetermined deflection angle, optical signal switching can be performed.

Namely, the input side cable 101A and the output side cable 109B of the laser beams 103A being switched are specified. The information thereof is input from the outside by the deflection angle control signals 201 into the deflection angle control unit 61 of each optical switching device 108, and is input into the decoding unit 61a.

Target level signals 204 corresponding to the target deflection angle of the rotation mirror 5 are generated by the decoding unit 61a. A deflection difference between detection level signals 203 that are based on a detected deflection angle and these target level signals 204 is obtained and input into the control section 61b. In the control section 61b this deflection difference is, for example, amplified, differentiated, integrated, or the like, and the drive signal 202 is adjusted such that the deflection angle of the rotation mirror 5 approaches the target deflection angle and is fed back to the actuator 5d.

In this way, because feedback control is performed using the angle detection apparatus 60 as a detection unit, the deflection angle of the rotation mirror 5 is modified to the target deflection angle. Accordingly, for example, if outside disturbance arises and the deflection angle shifts away from the target deflection angle, the target deflection angle is modified immediately in accordance with the size of the shift. Namely, real time feedback control can be achieved using an optical switching device 108 that includes the deflection angle control unit 61 and the angle detection apparatus 60.

In the optical signal switch system 106 of the present embodiment, because the angle detection apparatus 60 according to the first embodiment of the present invention is used, it is possible to perform multiple angle detection. Consequently, it is possible, for example, to make the angle detection sensitivities of a plurality of angle detections the same and to perform angle detection having multiple back ups. It is thus possible to provide an optical signal switch system that is compact in size and has excellent reliability.

It is also possible to make the angle detection sensitivities of a plurality of angle detections different, and to separate deflection angle control into coarse tuning and fine tuning by making one angle detection for coarse tuning and the other angle detection for fine tuning. As a result, the advantage is obtained that it is possible to improve both the angle detection range and the angle detection sensitivity while keeping the structure compact.

THIRD EMBODIMENT

Next, the information recording and reproduction system according to the third embodiment of the present invention will be described.

Figure 12:
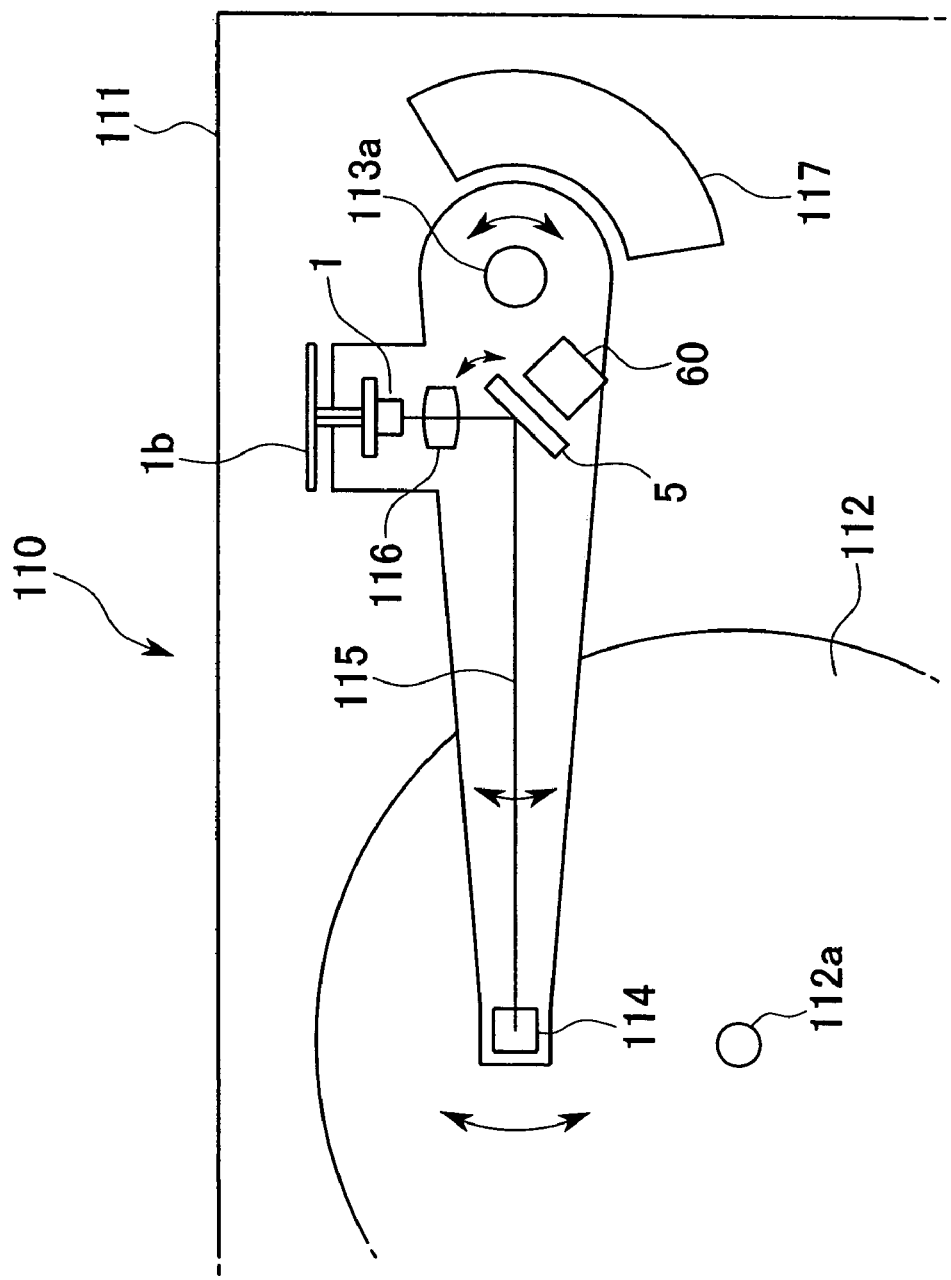
FIG. 12 is an explanatory plan view for explaining the schematic structure of the information recording and reproduction system according to the third embodiment of the present invention.

FIG. 12 is an explanatory plan view for explaining the schematic structure of the information recording and reproduction system 110 according to the third embodiment of the present invention.

This system is provided with an optical system formed by: a recording disk 112 (i.e., a recording medium) such as, for example, an optical disk or magneto-optical disk that records and reproduces information signals; a semiconductor laser 1 (i.e., a light source) that emits laser beams 115 (i.e., luminous flux) whose intensity and pulse width or the like have been modulated in accordance with information signals; an imaging lens 116 and an imaging lens unit 114 that perform image processing on the laser beams 115; a rotation mirror 5 that is driven to deflect by an actuator (not shown) to perform fine tracking control by deflecting the laser beams 115 and varying the position where they strike the imaging lens unit 114; and the angle detection apparatus 60, and also by an arm 113 on which the above optical system is placed that is capable of moving in a direction parallel to the recording surface of the recording disk 112 and in a vertical direction.

The semiconductor laser 1 is connected to a laser drive unit 1b that modulates the semiconductor laser 1 using information signals.

The rotation mirror 5 may be formed having the structure shown in FIG. 1. The angle detection apparatus 60 is the one described in the first embodiment of the present invention.

The symbol 111 indicates a housing. Inside the housing 111 a recording disk 112 is placed on a drive shaft 112a that is driven to rotate, for example, by a DC control motor or the like. The recording disk 112 is held so as to be rotatable around the drive shaft 112a.

On at least one surface of the recording disk 112 there is provided a recording surface that enables either the recording or reproduction of optical signals or both the recording and reproduction of optical signals to be performed. On a formatted recording disk 112 track signals are formed in a circumferential direction of a recording surface, and recording positions of the information signals are logically divided in a radial direction.

The arm 113 is positioned above the recording surface and is resiliently supported in a vertical direction relative to the recording disk 112. The arm 113 is supported so as to be able to be rotated in a direction parallel to the recording surface of the recording disk 112 using a rotating shaft 113a. The arm 113 is able to be driven to rotate around the rotation shaft by a drive coil 117 formed by an electromagnetic coil or the like.

The imaging lens 116 is formed so as to appropriately shape laser beams 115 emitted from the semiconductor laser 1 into, for example, parallel beams. The imaging lens unit 114 receives laser beams 115 and forms them into an image on the recording surface. In addition, the imaging lens unit 114 is formed so as to receive reflected light from the recording surface, and for each light receiving element thereof to receive respectively signal light corresponding to information signals, focus detection light for performing focus control, and tracking detection light for performing tracking control.

A rotation mirror 5 for performing fine tracking control by varying the position where the laser beams 115 strike the imaging lens unit 114 is provided together with the angle detection apparatus 60 between the imaging lens 116 and the imaging lens unit 114.

Next, the operation of this system will be described centered on the tracking control according to the present invention.

Firstly, laser beams 115 are irradiated onto a recording surface of the recording disk 112. Reflected light is then received by the imaging lens unit 114 and tracking signals are picked out. Information such as the track position and amount of shift from the track is acquired therefrom. Based on this information, coarse control of the rotation position of the arm 113 is performed by the drive coil 117 and movement between tracks and following of a track is performed.

Furthermore, in order to perform more precise tracking, the rotation mirror 5 is slanted, the laser beams 115 are deflected, and the shift of the incident position thereof on the imaging lens unit 114 and also the image forming position in the radial direction on the recording surface is fine tuned. At this time, the deflection angle of the rotation mirror 5 is detected by the angle detection apparatus 60 and feedback control is performed. For this feedback control, the same deflection angle control method as that of the optical signal switching system according to the second embodiment of the present invention may be used.

In this way, by forming an information recording and reproduction system using the angle detection apparatus 60 according to the first embodiment of the present invention, because it is possible to form the angle detection apparatus 60 in a compact size, the arm 113 can be formed having a small and light configuration. Accordingly, the advantage is obtained that it is possible to raise the mechanical response characteristics.

Moreover, because it is possible to perform multiple angle detection, for example, it is possible to make the angle detection sensitivity of a plurality of angle detections the same and perform angle detection that is backed up several times. Consequently, an information recording and reproduction system that is compact and is reliable is obtained.

Alternatively, it is also possible to make the angle detection sensitivities of a plurality of angle detections different, and to separate deflection angle control into coarse tuning and fine tuning by making one angle detection for coarse tuning and the other angle detection for fine tuning. As a result, the advantage is obtained that it is possible to improve both the angle detection range and the angle detection sensitivity while keeping the structure compact.

EXAMPLES

Next, numerical examples of the second variant example will be described with reference made to FIG. 5 as an example of the angle detection apparatus 60 according to the above described first embodiment.

FIG. 5 is an optical path diagram showing an optical path having the structural parameters of the optical system shown below in a case when the reflection surface used for detection 5 is rotated by the angle $\Delta\theta$ around the X axis. Here, the wavelength of the light source is 785 nm. A description of the coordinate system and symbols and the like is omitted as these have already been described above.

$r_i$, $d_i$, and $n_i$ (wherein i is an integer) shown in FIG. 5 correspond to the structural parameters $r_i$, $d_i$, and $n_i$ of the optical system shown below. The laser emission point 1a is a substance surface, and the light receiving surfaces of the four section light receivers 10A and 10B are image surfaces. The index of refraction shown is for the d line (having a wavelength of 587.56 nm).

Optical Path 1 is an optical path of the splitting surface reflected light 2a, and Optical Path 2 is an optical path of the splitting surface transmitted light 2b.

[Optical Path 1]

Surface number Radius of curvature Spacing Index of refraction Abbe's number

| Substance surface | $\infty$ | $d_0 = 3.78$ | | |
|---|---|---|---|---|
| 1 | $r_1 = 4.29$ | $d_1 = 2.00$ | $n_1 = 1.51680$ | $v_1 = 64.17$ |
| 2 | $r_2 = -4.29$ | $d_2 = 2.00$ | | |
| 3 | $r_3 = \infty$ | $d_3 = 2.00$ | | |
| 4 | $r_4 = \infty$ | $d_4 = 2.00$ | $n_2 = 1.51680$ | $v_2 = 64.17$ |
| 5 | $r_5 = \infty$ | $d_5 = 2.00$ | $n_3 = 1.51680$ | $v_3 = 64.17$ |
| 6 | $r_6 = \infty$ | $d_6 = 1.00$ | | |
| 7 | $r_7 = 6.22$ | $d_7 = 1.52$ | $n_4 = 1.51680$ | $v_4 = 64.17$ |
| 8 | $r_8 = \infty$ | $d_8 = 2.00$ | | |
| 9 | $r_9 = \infty$ | $d_9 = 0.00$ | | |
| Image surface | $\infty$ | 0.00 | | |

[Optical Path 2]

Surface number Radius of curvature Spacing Index of refraction Abbe's number

| Substance surface | $\infty$ | $d_0 = 3.78$ | | |
|---|---|---|---|---|
| 1 | $r_1 = 4.29$ | $d_1 = 2.00$ | $n_1 = 1.51680$ | $v_1 = 64.17$ |
| 2 | $r_2 = -4.29$ | $d_2 = 2.00$ | | |
| 3 | $r_3 = \infty$ | $d_3 = 2.00$ | | |
| 4 | $r_4 = \infty$ | $d_4 = 2.00$ | $n_2 = 1.51680$ | $v_2 = 64.17$ |
| 5 | $r_5 = \infty$ | $d_5 = 2.00$ | $n_3 = 1.51680$ | $v_3 = 64.17$ |
| 10 | $r_{10} = \infty$ | $d_{10} = 1.00$ | | |
| 11 | $r_{11} = 3.21$ | $d_{11} = 1.70$ | $n_5 = 1.80318$ | $v_5 = 46.38$ |
| 12 | $r_{12} = \infty$ | $d_{12} = 0.50$ | | |
| 13 | $r_{13} = \infty$ | $d_{13} = 0.00$ | | |
| Imaging surface | $\infty$ | 0.00 | | |

As is shown above, in this example, it is possible to form an extremely small optical system in which Optical Path 2 has an air spacing of approximately 12 mm, and the length of Optical Path 1 that is bent in an orthogonal direction from the optical axis of Optical Path 2 has an air spacing of 5.2 mm.

The above is a numerical example of the second variant example of the first embodiment, however, specific examples can also be given of the other embodiments in the same way.

Note that in the second and third embodiments of the present invention a description is given of when the angle detection apparatus of the first embodiment of the present invention is applied to an optical signal switch system and an information recording and reproduction system, however, the angle detection apparatus of the present invention can also be applied to other types of angle detection. For example, the angle detection apparatus of the present invention is also effective in optical telecommunications and laser radar and the like.

As has been described above, according to the angle detection apparatus of the present invention, it is possible using a compact structure to make multiple detections of an inclination angle of a detection object, and by using such multiple detections the effect is achieved that it is possible to improve various performances such as, for example, apparatus reliability, the accuracy of the inclination angle detection, and the detection range.

In addition, according to the optical signal switch system and the information recording and reproduction system of the present invention, the effect is achieved that it is possible to improve the system reliability and various performances such as, for example, switching performance and tracking performance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An angle detection optical system, comprising:
    a light source that irradiates light onto a reflective surface for detection provided on a detection object;
    an optical path splitting element that splits reflected light that has been reflected by the reflective surface for detection into first and second luminous fluxes that are respectively propagated on at least first and second optical paths that are different from each other;
    a first optical detector that is placed on the first optical path so as to receive the first luminous flux; and
    a second optical detector that is distanced from the first optical detector and placed on the second optical path so as to receive the second luminous flux; wherein a first amount of movement of the first luminous flux on a first light receiving surface of the first optical detector is different from a second amount of movement of the second luminous flux on a second light receiving surface of the second optical detector, and the first and second amount of movement are caused by a variation in the inclination angle of the detection object.

2. The angle detection optical system according to claim 1, wherein as first length of the first optical path that is defined between the reflective surface for detection and a first light receiving surface of the first optical detector is different from a second length of the second optical path that is defined between the reflective surface for detection and a second light receiving surface of the second optical detector.

3. The angle detection optical system according to claim 1, wherein the first and second optical detectors are different from each other in characteristic of angle detection sensitivity.

4. The angle detection optical system according to claim 1, wherein the optical path splitting element comprises a beam splitter with an optical path splitting surface that splits the reflected light into the first and second luminous flexes.

5. The angle detection optical system according to claim 1, further comprising:
    at least one optical surface with an optical power that is placed between the optical path splitting element and at least one of the first and second optical detectors.

6. The angle detection optical system according to claim 4, wherein the at least one optical surface is provided integrally to the at least one of the first and second optical detectors.

7. The angle detection optical system according to claim 4, wherein the at least one optical surface comprises first and second optical surfaces that are different in optical power from each other and are respectively placed on the first and second optical paths.

8. The angle detection optical system according to claim 5, wherein the at least one optical surface has a positive optical power.

9. The angle detection optical system according to claim 5, wherein the at least one optical surface comprises a reflective surface that has a positive optical power.

10. The angle detection optical system according to claim 5, wherein the optical path splitting element comprises a polarization splitting surface that either transmits or reflects the light by a polarization component, and
the angle detection optical system further comprises: a ¼ wavelength plate that is placed between the polarization splitting surface and the at least one optical surface.

11. The angle detection optical system according to claim 1, wherein the optical path splitting element comprises a polarization beam splitter.

12. The angle detection optical system according to claim 11, wherein the optical path splitting element comprises a nitrate material in which $n_d \rightarrow \geq 1.7$ wherein $n_d$ is the index of refraction.

13. The angle detection optical system according to claim 1, wherein at least one of the first and second optical detectors comprises a four section light receiver provided with a light receiving surface divided into four sections.

14. The angle detection optical system according to claim 1, wherein at least one of the first and second optical detectors comprises a two-dimensional position detection light receiver.

15. An angle detection apparatus comprising:
a light source that irradiates light onto a reflective surface for detection provided on a detection object;
an optical path splitting element that splits reflected light that has been reflected by the reflective surface for detection into first and second luminous fluxes that are respectively propagated on at least first and second optical paths that are different from each other;
a first optical detector that is placed on the first optical path so as to receive the first luminous flux;
a second optical detector that is distanced from the first optical detector and placed on the second optical path so as to receive the second luminous flux; and
a signal processor that receives a first detection signal from the first optical detector and a second detection signal from the second optical detector and processes the first and second detection signals so as to generate an angle detection signal that corresponds to a magnitude of an inclination angle of the detection object.

16. An optical signal switch system comprising:
at least one light deflection element that is provided on a detection object and switches optical paths of optical signals;
a reflective surface;
that is provided on the detection object;
a light source that irradiates light onto the reflective surface;
an optical path splitting element that splits reflected light that has been reflected by the reflective surface into first and second luminous fluxes that are respectively propagated on at least first and second optical paths that are different from each other;
a first optical detector that is placed on the first optical path so as to receive the first luminous flux;
a second optical detector that is distanced from the first optical detector and placed on the second optical path so as to receive the second luminous flux;
a signal processor that receives a first detection signal from the first optical detector and a second detection signal from the second optical detector and processes the first and second detection signals so as to generate an angle detection signal that corresponds to a magnitude of an inclination angle of the detection object; and
a deflection angle control unit that controls a deflection angle of the light deflection element based on the angle detection signal supplied by the signal processor.

17. An information recording and reproduction system that performs at least one of recording and reproduction of information signals, the information recording and reproduction system comprising:
a light source that emits a first luminous flux;
an optical system that forms an image of the first luminous flux on a recording surface of a recording medium;
a light deflection element that is placed in the optical system, the light deflection element having a reflective surface that varies in an inclination angle depending upon a deflection angle of the first luminous flux that has been deflected in a plane that is parallel to the recording surface;
a light source that irradiates light onto the reflective surface;
an optical path splitting element that splits reflected light that has been reflected by the reflective surface into first and second luminous fluxes that are respectively propagated on at least first and second optical paths that are different from each other;
a first optical detector that is placed on the first optical path so as to receive the first luminous flux:
a second optical detector that is distanced from the first optical detector and placed on the second optical path so as to receive the second luminous flux; and
a signal processor that receives a first detection signal from the first optical detector and a second detection signal from the second optical detector and processes the first and second detection signals so as to generate an angle detection signal that corresponds to a magnitude of an inclination angle of the detection object.

* * * * *

UNITED STATES PATENT AND TRADEMARK OFFICE
CERTIFICATE OF CORRECTION

| | |
|---|---|
| PATENT NO. | : 7,116,412 B2 |
| APPLICATION NO. | : 10/743725 |
| DATED | : October 3, 2006 |
| INVENTOR(S) | : Koichi Takahashi |

It is certified that error appears in the above-identified patent and that said Letters Patent is hereby corrected as shown below:

Column 7, line 66, Change "symbol 11 a shows" to --symbol 11$a$ shows--;

Column 17, line 50, No new paragraph here. Do not indent;

Column 21, lines 9-10, Reduce font size of table headings "Surface number Radius of curvature  Spacing  Index of refraction  Abbe's number" to that used in body of the table;

Column 21, lines 9-13, Close space between table headings "Surface number Radius of curvature  Spacing  Index of refractin  Abbe's number" and top of table;

Column 21, lines 9-13, Align headings "Surface number Radius of curvature Spacing  Index of refraction  Abbe's number" with respective columns;

Column 21, line 14, Move "∞" right to align it with the other numbers/symbols on right side of equations;

Column 21, line 22, Move "∞" right to align it with the other numbers/symbols on right side of equations;

Column 22, line 40, Change "wherein as first length" to --wherein a first length--;

Column 22, line 53, Change "luminous flexes" to --luminous fluxes--;

Column 22, lines 59-60, Change "to claim 4" to --to claim 5-- and

Column 22, lines 63-64, Change "to claim 4" to --to claim 5--.

Signed and Sealed this

First Day of May, 2007

JON W. DUDAS
*Director of the United States Patent and Trademark Office*